(12) United States Patent
Wakeland-Rosen et al.

(10) Patent No.: US 12,016,349 B2
(45) Date of Patent: *Jun. 25, 2024

(54) HEMP SEED PRODUCTS AND METHODS AND SYSTEMS FOR PRODUCING SAME

(71) Applicant: VICTORY FOODS, PBC, Carrollton, KY (US)

(72) Inventors: Chad Wakeland-Rosen, Carrollton, KY (US); Benjamin Raymond, Carrollton, KY (US)

(73) Assignee: Victory Foods, PBC, Carollton, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,956

(22) Filed: Jan. 9, 2023

(65) Prior Publication Data

US 2023/0157313 A1 May 25, 2023

Related U.S. Application Data

(63) Continuation of application No. 17/399,948, filed on Aug. 11, 2021, now Pat. No. 11,576,400, which is a continuation of application No. PCT/US2021/040284, filed on Jul. 2, 2021.

(60) Provisional application No. 63/048,591, filed on Jul. 6, 2020.

(51) Int. Cl.
| | |
|---|---|
| *A23J 1/00* | (2006.01) |
| *A23D 9/04* | (2006.01) |
| *A23N 5/00* | (2006.01) |
| *A23N 5/08* | (2006.01) |
| *B02B 3/04* | (2006.01) |

(52) U.S. Cl.
CPC ............... *A23J 1/007* (2013.01); *A23D 9/04* (2013.01); *A23N 5/002* (2013.01); *A23N 5/08* (2013.01); *B02B 3/04* (2013.01); *A23N 5/00* (2013.01)

(58) Field of Classification Search
None
See application file for complete search history.

(56) References Cited

U.S. PATENT DOCUMENTS

| | | | |
|---|---|---|---|
| 6,517,885 B2 | 2/2003 | Sakai et al. | |
| 7,687,648 B2 | 3/2010 | Smallridge et al. | |
| 11,576,400 B2* | 2/2023 | Wakeland-Rosen | ...... B02B 3/04 |
| 2006/0111578 A1 | 5/2006 | Arhancet et al. | |
| 2020/0138055 A1* | 5/2020 | Schein | ...... A23J 3/14 |

FOREIGN PATENT DOCUMENTS

| | | |
|---|---|---|
| CA | 2751914 A1 | 9/2010 |
| CN | 104450164 A | 3/2015 |
| CN | 108641812 A | 10/2018 |
| CN | 109263118 A | 1/2019 |
| CN | 110551564 A | 12/2019 |
| EP | 1074605 A1 | 2/2001 |
| WO | 2019048695 A1 | 3/2019 |

OTHER PUBLICATIONS

Aladic, K., Jarni, K., Barbir, T., Vidovic, S., Vladic, J., Bilic, M., Jokic, S. (2015). Supercritical CO2 extraction of hemp (*Cannabis sativa* L.) seed oil. Industrial Crops and Products, Mar. 12, 2015, pp. 472-478.
Gaber, M., Tujillo, F., Mansour, M., Juliano, P. (2018). Improving Oil Extraction from Canola Seeds by Conventional and Advanced Methods. Food Engineering Review, Apr. 3, 2018, pp. 198-210.
Kartika, I., Pontalier, P.Y., Rigal, L. (2009). Twin-screw extruder for oil processing of sunflower seeds: Thermo-mechanical pressing and solvent extraction in a single step. Industrial Crops and Products, Dec. 29, 2009, pp. 297-304.
Aladic, K., Jokic, S., Moslavac, T., Tomas, S., Vidovic, S., Vladic, J., Subaric, D. (2013). Cold Pressing and Supercritical CO2 Extraction of Hemp (*Cannabis sativa*) Seed Oil. Chem. Biochem. Engineering Q, Nov. 26, 2013, pp. 489-498.
De Smet Rosedowns Ltd, What are the characteristics of different types of Pressing Plant?
De Smet Rosedowns Ltd, Cooking.
De Smet Rosedowns Ltd, What is the optimal level of decortication?

* cited by examiner

*Primary Examiner* — Christian L Fronda
(74) *Attorney, Agent, or Firm* — Hunt IP Law (57) ABSTRACT

Methods and systems for producing improved hemp seed products, such as proteins and oils are provided.

19 Claims, 3 Drawing Sheets
(1 of 3 Drawing Sheet(s) Filed in Color)

HEMP SEED PRODUCTS AND METHODS AND SYSTEMS FOR PRODUCING SAME

CLAIM OF PRIORITY

The present application is a continuation of U.S. application Ser. No. 17/399,948, filed on Aug. 11, 2022, which is a bypass continuation application of International Application No. PCT/US2021/40284, filed on Jul. 2, 2021, which in turn claims benefit of Provisional Application No. 63/048,591, entitled "HEMP SEED PRODUCTS AND METHODS AND SYSTEMS FOR PRODUCING SAME," filed Jul. 6, 2020. The entire contents of each of the foregoing are hereby incorporated by reference herein.

BACKGROUND

Field

Methods and systems for producing improved hemp seed products, such as proteins and oils are provided.

Background

Hemp seeds and their derivative proteins and oils are considered by dieticians and nutritionists as being ideal for human health and nutrition, but astringency, bitterness and vegetal type flavors are major sensory challenges of hemp seed food ingredients. The market for hemp seed derived food ingredients is therefore limited.

SUMMARY

Some embodiments of the invention relate to a system for processing hemp seeds to recover at least one product. In some embodiments, the system can include a sorter, adapted to separate the hulls and the hemp hearts to produce an isolated hemp heart fraction is substantially free of hulls. In some embodiments, the system can include a conditioner, adapted to condition the isolated hemp hearts to a predetermined internal temperature and moisture content, resulting in conditioned hemp hearts. In some embodiments, the system can include a press, adapted to permit extraction of oil from the hemp hearts, resulting in a hemp hearts press cake. In some embodiments, the system can include a delumper, adapted to reduce size of lumps from the hemp hearts press cake, resulting in a substantially uniform hemp hearts particles. In some embodiments, the system can include a super-critical fluid or a nonpolar solvent extractor, adapted to de-oil the hemp hearts powder to produce an extracted hemp seed product. In some embodiments, the system can include a mill, suitable to reduce particle size to less than 500 micron. In some embodiments, upon operation of the system, at least one product having at least one value parameter is recovered, wherein the product is at least one of an improved hemp seed oil product and an improved hemp seed protein product.

In some embodiments, the system, adapted for continuous processing, can further include a diverter adapted to divert the uniform hemp hearts particles into a first output stream and a second output stream. In some embodiments, the system adapted for continuous processing can further optionally include a returner adapted to return the first output stream to the system between the conditioner and the press. In some embodiments, the system adapted for continuous processing can further include a mixer adapted to mix the first output stream with the conditioned hemp hearts.

In some embodiments, the system adapted for continuous processing can further include a collector adapted to collect the second output stream.

In some embodiments, in the system adapted for continuous processing, the press is a continuous screw type expeller press or a twin-screw expeller press.

In some embodiments, the system adapted for batch processing, can additionally include a press bag adapted to contain the isolated hemp hearts after conditioning, wherein the press is adapted to apply sufficient pressure to the press bag containing isolated hemp hearts to permit extraction of oil from the hemp hearts, resulting in a hemp hearts press cake.

In some embodiments, the product is an improved hemp seed oil product, and wherein the at least one value parameter can be determined by comparison with a hemp seed oil product produced by cold-pressing of whole hemp seeds, and wherein the value parameter can be decreased oil oxidation, increased shelf life, decreased rancidity, improved user acceptance, lighter color, improved flavor and aroma, and/or the like.

In some embodiments, the product is an improved hemp seed protein product, and wherein the at least one value parameter can be determined by comparison with a cold-press hemp seed press cake, and wherein the value parameter can be lighter color, improved mouth feel, improved user acceptance, improved uniformity, improved shelf life, decreased oxidation; decreased rancidity, improved water holding, improved oil holding, improved dispersion in water, improved foaming capacity, improved gelation, improved emulsifying capacity, and/or the like.

In some embodiments, the sorter can include at least one of a size, shape and/or spectrophotometric detection of materials to be sorted.

In some embodiments, the system can further include a feedback component.

In some embodiments, the feedback component can be adapted to detect a parameter of the substantially uniform hemp heart particles before the particles reach the diverter, to determine a proportion of the particles to divert to the first output stream. In some embodiments, the parameter is oil content of the press cake after delumping.

Some embodiments of the invention relate to a batch-based method of producing an oil product from hemp seeds. In some embodiments, the method can include dehulling the hemp seeds; sorting hemp hearts from hemp seed hulls; heating the isolated hemp hearts to at least 30 C to produce conditioned hemp hearts; bagging the hemp hearts in a bag adapted to withstand high pressures and permit oil escape from the bag while containing solids within the bag; applying hydraulic pressure to the bagged hemp hearts for a period of time to permit extraction of oil from the hemp hearts; and/or recovering the oil.

Some embodiments of the invention relate to a continuous method of producing an oil product from hemp seeds. In some embodiments, the method can include a) dehulling the hemp seeds; b) sorting hemp hearts from hemp seed hulls; c) heating the isolated hemp hearts to at least 30° C. to produce conditioned hemp hearts; d) expeller-pressing the conditioned hemp hearts to produce pressed isolated hemp hearts; e) de-lumping the pressed isolated hemp hearts; f) dividing the de-lumped pressed isolated hemp hearts into a first output stream and a second output stream; g) mixing the first output stream with the conditioned hemp hearts after said conditioned hemp hearts are conditioned and before they are pressed, to produce a mixed product comprising the conditioned hemp hearts and the first output stream; and/or h) recovering the oil from the expeller pressing step; and wherein the steps f) and g) are repeated until the second output stream is <15% residual oil.

Some embodiments of the invention relate to a method of producing a protein product from hemp seeds. In some embodiments, the method can include a) dehulling the hemp seeds; b) sorting hemp hearts from hemp seed hulls; c) heating the isolated hemp hearts to at least 30° C.; d) applying pressure to the heated hemp hearts for a period of time to permit extraction of oil from the hemp hearts; and/or e) recovering and delumping the solids; and extracting residual oil from the solids to produce a protein product comprising less than 15% oil by weight. In some embodiments, the method can additionally include the step of bagging the hemp hearts after the heating step in a bag adapted to withstand high pressures and permit oil escape from the bag while containing solids within the bag; wherein the applying pressure step can include applying hydraulic pressure to the hemp hearts. In some embodiments, the method can additionally include f) dividing the solids into a first stream and a second stream and re-cycling the first stream through steps d)-f) and collecting the second stream; and/or g) removing residual oil from the second solid fraction to produce a protein product comprising less than 15% oil by weight.

In some embodiments, the applying pressure step can include applying expeller pressure.

In some embodiments, the oil from the applying pressure step can be recovered so that the method simultaneously produces a protein product and an oil product from hemp seeds.

In some embodiments, the sorting step comprises size, shape and/or spectrophotometric detection.

In some embodiments, the hemp hearts can be substantially free of non-heart material.

In some embodiments, the non-heart material can include shells, seed coat, fiber, foreign material, and/or the like.

Some embodiments of the invention relate to an apparatus that can include an input of hemp seeds; a dehuller, adapted to dehull the hemp seeds, resulting in hulls and hemp hearts; a sorter, adapted to separate the hulls and the hemp hearts to produce an isolated hemp heart fraction that is substantially free of hulls and seed coat; a conditioner, adapted to condition the isolated hemp hearts to a pre-determined internal temperature and moisture content; a bag adapted to withstand high pressures and permit oil escape from the bag while containing solids within the bag; a press, adapted to permit extraction of oil from the hemp hearts, resulting in a hemp hearts press cake; a delumper, adapted to reduce size of lumps from the hemp hearts press cake, resulting in a substantially uniform hemp hearts particles; a super-critical fluid or a nonpolar solvent extractor, adapted to de-oil the second output stream to produce an extracted hemp seed product; and/or a mill, suitable to reduce particle size to less than 500 microns.

Some embodiments of the invention relate to an apparatus that can include an input of hemp seeds; a dehuller, adapted to dehull the hemp seeds, resulting in hulls and hemp hearts; sorter, adapted to separate the hulls and the hemp hearts to produce an isolated hemp heart fraction that is substantially free of hulls and seed coat; a conditioner, adapted to condition the isolated hemp hearts to a pre-determined internal temperature and moisture content; a press, adapted to permit extraction of oil from the hemp hearts, resulting in a hemp hearts press cake; a delumper, adapted to reduce size of lumps from the hemp hearts press cake, resulting in a substantially uniform hemp hearts particles; a diverter adapted to divert the uniform hemp hearts particles into a first output stream and a second output stream; a returner adapted to return the first output stream to the system between the conditioner and the press; a mixer adapted to mix the first output stream with the conditioned hemp hearts; a collector adapted to collect the second output stream; a super-critical fluid or a nonpolar solvent extractor, adapted to de-oil the second output stream to produce an extracted hemp seed product; a mill, suitable to reduce particle size to less than 500 microns; and/or a feedback component. In some embodiments, the feedback component can include a proximate composition or oil measuring device.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

DETAILED DESCRIPTION

The invention relates to hemp seed products and methods and systems for producing improved hemp seed products. The hemp seed product can be a protein product isolated from hemp seeds and/or an oil product isolated from hemp seeds.

Current State of the Art

Hemp seed oil is manufactured around the world, with production in Canada, China, Europe and the United States. Common methods of production are similar in these regions and typically rely on one technology: screw-type expeller pressing. In expeller presses, the barrel and screw geometry are designed so that as the material moves forward in the barrel, it is subject to increasing compression and shear forces. The pressing process releases oil from the biomass, which is collected through perforations in the barrel. Expeller press extraction is employed for oil recovery from a variety of food materials including olives, canola seed, soybeans, coconut, palm hearts and many others. It is most suitable for fibrous, high-oil content raw materials. Biomass to be expeller screw-pressed is usually cleaned, conditioned, and then fed into the expeller. The endogenous fiber provides a source of friction in the press to prevent co-rotation and poor pressing efficiency. It also serves as a filter medium to prevent solids known in the industry as "foots" from exiting at the oil perforations. Whole hemp seeds and de-hulled hemp seeds can be well suited to this process, if the shell is used in the pressing. If the de-hulled, cleaned hearts are used, meaning without shells in the expeller press, it is common to produce hemp heart paste with very little oil expression. This approach is not typically practiced due to the poor results.

Typically, cleaned hemp seeds are conditioned and then conveyed into a hopper. The hopper feeds into the screw press. Some designs have an additional horizontal or vertical screw that feeds the main oil-expelling screw to increase oil removal and throughput. In this case, biomass receives a first pressing in the vertical screw barrel and then enters the horizontal screw barrel for second pressing. In some designs, the horizontal or vertical screw may simply be present to force material into the main pressing zone and does not itself expel oil. Even with improvements in barrel and screw design, some minimum amount of fiber is required to prevent the biomass from co-rotating with the screw, or worse, becoming a paste, similar to a nut butter. There is no precise minimum amount of fiber for such use; it must be determined in empirical fashion on a case-by-case basis. To successfully press hemp seeds for edible oil, the whole seeds are pressed, and a mixture of hearts and hulls, or hearts and exogenous fiber, are pressed together. The fiber content of the hulls provides necessary friction to prevent co-rotation, prevents solids from exiting the perforations and prevents the mass from being ground into hemp heart paste. Pressing conditions such as barrel residence time, temperature, mixing, shear and compression pressure are all dependent on specific equipment and will vary. The typical output of this process is a green-colored, opaque oil with small pieces of hull and heart mixed in. The foots can be removed by simple gravity-driven settling or by filtration, or the output can be centrifuged to increase process throughput. The green oil is filtered and packaged under inert gas. The green oil produced by whole-seed expeller screw pressing suffers from poor shelf life, intense green color and grassy flavors, and produces a large quantity of low value co-product called press cake. The press cake retains a grainy texture even when finely ground and sifted, due to the large quantity of water-insoluble hull pieces. Market applications are limited for this large-volume co-product.

It is commonplace to perform a particle size and density-based classification to fractionate the resulting press-cake into protein-rich powders or meals. These powders range from light green to deep green to brown. They suffer from astringency, grainy mouthfeel and poor protein functionality in food and beverage applications. This is due to the inclusion of the shell, which cannot be totally removed by existing technologies. About 8-15% of the available oil remains with the seed cake after cold expeller pressing of seeds. This seed cake has a lesser protein content and the presence of fiber and oil make this a low-value stream. Further, there are hemp seed protein products made from this screw-type expeller process using common protein-processing techniques such as alkaline protein extraction. These hemp seed products also suffer from poor flavor and limited application suitability.

The following embodiments offer improvements over what is currently known in the art.

Methods

Methods for producing improved hemp seed products are provided. The hemp seed product can be a protein, an oil, or flour isolated from hemp seeds. In some embodiments, the method is a "batch" method, wherein one batch is produced at a time. In such embodiments, a batch can be moved from unit operation to unit operation en masse with a pause in between each unit operation. This is commonplace in pharmaceuticals and some food manufacture. In some embodiments, the method is "continuous" or "semi-continuous" wherein the method continuously produces batches, as will be explained in in further detail below. Continuous manufacturing means that the material is continuously processed or in motion from the start to the end of the process without interruption. Continuous manufacturing requires careful attention to mass balance and unit operation capacity, flexibility, and process control. Continuous manufacturing is common in petrochemical, paper, metal, and some food processing operations. Semi-continuous production can mean that some unit operations are batchwise while others are fully continuous. It can also mean that some unit operations are operated in in a staggered fashion such as multiple reactors performing the same unit operation. For example, reactor A is processing while reactor B is being unloaded/loaded and the operation cycles between reactors A and B with minimized equipment downtime.

Definitions of batch, semi-continuous, and continuous operation vary by industry and profession. Continuous can be defined as without break, cessation, or interruption, for a given period of time, and in the context of processes is typically used in contrast to batch-based processes which have a beginning and end for each batch and, usually, an interval between batches. The method can also be batch-continuous, with some steps continuous and others in batch-wise fashion. In some embodiments, a continuous process permits continuous loading of starting material and continuous throughput to produce protein and/or oil products, where "continuous" means able to be continued for at least 4, 6, 8, 10, 12, 14, 18, 24, 36, or 48 hours, or more. In some embodiments, the period of time can be over 1, 5, 10, 15, 20, 25, 30 or more days.

In some embodiments, the method can be partially or completely robotic. Robotic can be defined as without the need for user intervention.

In a continuous method for producing a protein product, the method can include (a) dehulling the hemp seeds, (b) sorting hemp hearts from the dehulled hemp seed hulls, (c) heating the isolated hemp hearts to at least 30° C., (d) applying pressure to the heated hearts for a period of time to permit extraction of oil from the hemp hearts, (e) recovering and de-lumping the solids, (f) dividing the solids into a first stream and a second stream and re-cycling the first stream through steps (d)-(e) and collecting the second stream; and/or (g) removing residual oil from the second solid fraction to produce a protein product comprising less than 15% oil by weight. The pressure used in the method can be any source and manner of applying pressure that is compatible with the stated parameters and outcomes and can include, but is not necessarily limited to expeller pressing with a screw-type continuous expeller press or a twin-screw type continuous press.

In a continuous method for producing an oil product from hemp seeds, the method can include (a) dehulling the hemp seeds; (b) sorting hemp hearts from hemp seed hulls; (c) heating the isolated hemp hearts to at least 30° C. to produce conditioned hemp hearts; (d) expeller-pressing the conditioned hemp hearts to produce pressed isolated hemp hearts; (e) de-lumping the pressed isolated hemp hearts; (f) dividing the de-lumped pressed isolated hemp hearts into a first output stream and a second output stream; (g) mixing the first output stream with the conditioned hemp hearts after said conditioned hemp hearts are conditioned and before they are pressed, to produce a mixed product comprising the conditioned hemp hearts and the first output stream; and/or (h) recovering the oil from the expeller pressing step. In some embodiments, the steps f) and g) are repeated until the second output stream is <15% residual oil. The pressure used in the method can be any source and manner of applying pressure that is compatible with the stated parameters and outcomes and can include, but is not necessarily limited to expeller pressing with a screw-type continuous expeller press or a twin-screw type continuous press.

In a batch method for producing a protein product from hemp seeds, the method can include dehulling the hemp seeds; sorting hemp hearts from hemp seed hulls; heating the isolated hemp hearts to at least 30° C.; bagging the hemp hearts after in a bag adapted to withstand high pressures and permit oil escape from the bag while containing solids within the bag; applying hydraulic pressure to the bagged hemp hearts for a period of time to permit extraction of oil from the hemp hearts; recovering and de-lumping the solids; and extracting residual oil from the solids to produce a protein product comprising less than 15% oil by weight.

In a batch method for producing an oil product from hemp seeds, the method can include dehulling the hemp seeds; sorting hemp hearts from hemp seed hulls; heating the isolated hemp hearts to at least 30° C. to produce conditioned hemp hearts; bagging the hemp hearts in a bag adapted to withstand high pressures and permit oil escape from the bag while containing solids within the bag; applying hydraulic pressure to the bagged hemp hearts for a period of time to permit extraction of oil from the hemp hearts; and recovering the oil.

In some embodiments, it is possible for a single continuous process to produce both an oil product and a protein product, although this is not required in all embodiments. Likewise, in some embodiments, it is possible for a single batch process to produce both an oil product and a protein product, although this is not required in all embodiments. Accordingly, some embodiments of the invention relate to a method for simultaneously producing a protein product and an oil product from hemp seeds using the methods disclosed herein.

The method can include dehulling the hemp seeds. Examples of dehulling methods can include dehulling and cleaning by an impact, roller or raspelling de-huller, aspirator, clipper cleaner, fluidized bed gravity table, sieve, indent cleaning, scalper, and/or the like. In some embodiments, the dehulling and cleaning step can produce dehulled hemp seeds that are substantially free of hemp seed shells, hemp seed coat and foreign material. Foreign material can be defined as any non-hemp material present on the hemp seeds. Substantially free can be defined as a reduction of at least 50%, 60%, 70%, 80%, 90%, 99%, or more of the hemp seed shells, seed coat and/or foreign material that was present on the hemp seeds prior to the dehulling step.

The method can include sorting hemp hearts from the dehulled hemp seeds. The sorting step can include sieving, indent cleaning, scalping, aspiration, clipper cleaners, gravity tables, and/or optical sorting. The optical sorting can be based upon one or more of size, shape, and/or colorimetric or compositional assay. The optical sorting can include but need not be limited to visible light, near infrared light, or infrared light. In some embodiments, the dehulled hemp seeds are conveyed into a hopper that feeds an optical sorter. The optical sorter can use air flow to remove non-heart material from the dehulled hemp seeds. Non-heart material can include shells, seed coat, fiber, foreign material, and/or the like. In some embodiments, the non-heart material is carried from the dehulled hemp seeds into a collection vessel. In some embodiments, the sorting step produces hemp seed hearts that are substantially free of non-hemp seed heart material. Substantially free can be defined as a reduction of at least 50%, 60%, 70%, 80%, 90%, 95%, 99% or more of the non-heart material that was present on the hemp seeds prior to the sorting step. The isolated hemp seed hearts after the sorting step can be referred to as white hemp hearts (WHH) or primarily endosperm material or isolated hemp hearts. These hearts are substantially free from all non-heart material including but not limited to the hulls, fractional hull pieces, seed coat (the green covering interior to the hull, exterior to the heart) that cover the hemp endosperm (heart) and foreign materials (rocks, insects, stems, non-hemp seeds).

The method can include a heating step wherein the isolated hemp hearts are heated. The heating step can include the use of one or more of a heater, oven, roaster, conditioner, and/or the like. The unit used for heating can be any unit that heats a material such as a heated surface with a sweeping mixing blade, rotary drum, stacked, vertical plate, or spiral cookers. The heating step can be referred to as "conditioning." The isolated hemp hearts can be heated to an internal temperature of at least 30° C., 40° C., 50° C., 60° C., 70° C., 80° C., 90° C., 100° C., 110° C., 120° C., 130° C., 140° C., or more. For example, the isolated hemp hearts can be heated to an internal temperature of at least 60° C. and up to 140° C. Thermal treatment of the hemp hearts can reduce oil viscosity and rupture oil bodies, facilitating oil extraction. Thermal treatment of the hemp hearts can also inactivate enzymes deleterious to oil quality. However, excessive heating should be avoided as it may damage the oil and proteins in the hemp hearts. Excessive heating is a function of time and temperature. Greater temperatures can cause protein and oil damage in lesser time while prolonged exposure to lesser temperature can still cause protein and oil damage.

The method can include an expeller pressing step using a screw-type expeller press or the like. In these embodiments the heated, isolated hemp hearts can be conveyed into the feed opening or throat of the expeller press. The press can include a feeding screw, pre-pressing screw stage or a combination of both. The main pressing zones can incorporate a single or dual screw to convey the hearts through the machine. The heated, isolated hearts can be conveyed into the barrel of the press by the flighting on the screw, also known as a "worm" or "spindle". The diameter of the screw body may increase, while flighting spacing can be narrowed to continually increase shear and compression forces on the heated, isolated hearts. Breaker bars, interruptions in flighting, serrations or "teeth" on flighting and or the like can be used to facilitate oil expression. Expeller presses can have zones of increased mixing and shear and increased compression to optimize oil removal from the pressed biomass. The specific design may vary and is often proprietary to the particular expeller press manufacturer. Some expeller presses use single screws, multiple screws in sequence, or multiple screws that operate in a parallel, counter-rotating or co-rotating fashion. In some embodiments, the de-oiled isolated hemp hearts, now called "press cake," can have less than 20%, 15%, 10%, 5%, 4%, 2% or less residual oil by weight. Residual oil can include triglycerides, free fatty acids, tocopherols, phytosterols, polyphenols and other minor phytochemicals. In some embodiments, the step of continuous expeller pressing produces de-oiled isolated hemp hearts substantially free of chlorophyll and condensed tannins and other polyphenols that contribute to astringency and bitter flavors. Substantially free can be defined as a reduction of at least 50, 60, 70, 80, 90%, or more of the chlorophyll, condensed tannins, and polyphenols originally present in the hemp seed.

In some embodiments the continuous method can include conveying a portion of the de-oiled isolated hemp hearts back into the feed inlet or throat of the expeller press. Re-feeding the previously pressed material can serve as a source of a press aide to increase friction, prevent corotation, and prevent partially-pressed, heated, isolated hearts from extruding through the expeller press barrel, and increase overall de-oiling efficiency. The previously pressed material can be re-fed as a mixture of fresh, heated, isolated hearts in a ratio of 1:100 to 1:1. Re-feeding is performed continuously by conveying the previously pressed cake into a gravimetric or volumetric feeder. The measuring feeder is then used to maintain the appropriate ratio of previously pressed cake and un-pressed, conditioned, isolated hemp hearts. The re-fed material may be first reduced in particle size by de-lumping, cake breaking or cutting knives or other technology, or re-pressed in the same form it exited the expeller press. The ratio of previously pressed cake to un-pressed conditioned isolated hemp hearts can be continuously variable and controlled manually by human intervention or fully automated based upon feedback from the material and expeller machine. This feedback can include, but is not limited to, power consumption of the press, temperature of the press and or press cake and in-line nondestructive measurements of de-oiling efficacy. Online measurement is well known to those skilled in the art and can include Fourier-Transform near infrared, near infrared, and infrared analysis. These technologies can provide rapid proximate analysis of the press cake. Using these inputs, a control system can be devised to manually or automatically adjust the ratio of ratio of previously pressed cake to un-pressed conditioned isolated hemp hearts by increasing feeding rate of the previously pressed cake, conditioned, isolated hemp hearts, or both. Adjustments should be made as little as possible to avoid a gross upset condition of the process.

Thus, in some embodiments, the press cake can be divided into two streams, one goes forward to supercritical fluid and or subcritical liquid or gas solvent extraction and the other is recirculated to a point in the process that is upstream from, or at, the input of the expeller press. In some embodiments, supercritical solvent extraction is super critical $CO_2$. The liquid solvent can be a non-polar organic solvent like hexane, but any others known to those skilled in the art can be used.

In a batch process, the method can include applying hydraulic pressure to the heated hemp hearts for a period of time. The hydraulic pressure can be applied by a hydraulic press, and/or the like. Hydraulic pressure can be applied at 4000, 5000, 5500, 6000, 6500, 7000, 7500, 8000, 8500, 8900, or more psi. The isolated hemp hearts can be loaded into containment bags prior to subjection to the hydraulic pressure. The containment bags are porous and are woven or non-woven, and can be made of any thermally stable, direct food-contact grade polymer. For example, the thermally stable polymer can be naturally derived type such as cotton or industrial hemp fiber, polyethylene terephthalate polyester, polyamide, polypropylene or a blend of the like. The bag can be capable of withstanding the process temperature and pressures without undue elongation of the fibers and/or polymers, without leaching of unwanted contaminants, without tearing or abrading and the like. The bag can be re-used until damage is noted by a machine operator. If damage is noted in a given bag, it should be discarded. In some embodiments, the applying hydraulic pressure step can occur at 20, 25, 30, 35, 40, 50, 55, 60, 65, 70, 75, 80, 90, 100, 110, 120, 130, 140 or more ° C. In some embodiments, the period of time can be 5, 10, 15, 30, 60, 75, 90, 120, or more minutes. In some embodiments, the applying hydraulic pressure step produces de-oiled isolated hemp hearts with reduced residual oil compared to isolated hemp hearts prior to the applying hydraulic pressure. In some embodiments, the de-oiled isolated hemp hearts, now called press cake, have less than 20, 15, 10, 5, 4, 2% residual oil by weight. Residual oil can include triglycerides, free fatty acids, tocopherols, phytosterols, polyphenols and other minor phytochemicals. In some embodiments, the step of applying hydraulic pressure produces de-oiled isolated hemp hearts substantially free of chlorophyll and condensed tannins and other polyphenols that contribute to astringency and bitter flavors. Substantially free can be defined as a reduction of at least 50, 60, 70, 80, 90%, or more of the chlorophyll, condensed tannins, and polyphenols originally present in the hemp seed.

In some embodiments, the method can include de-lumping the de-oiled isolated hemp hearts. The de-lumping step can be done by mixing, agitating, and/or the like with a de-lumping unit. For example, the de-lumping step can include use of a rotating cylinder with teeth or knives that can be blunt or sharpened or other means to physically break apart press cake into smaller particles. The teeth rotate and intermesh with static teeth to crush the cake into smaller pieces. If bags are employed, the de-oiled isolated hemp hearts can be removed from the containment bag prior to de-lumping. The de-lumping can produce hemp heart protein product pieces of less than 20, 15, 10, 5, 2.5 mm or less.

In some embodiments, the method can include extracting, separating, and/or recovering an oil from the hemp heart press cake pieces. The extracting, separating, and/or collecting can include use of supercritical $CO_2$, hexane, isohexane, pentane, butane, 2-methyltetrahydrofuran, ethyl acetate, and/or the like. The hemp heart protein product pieces can be loaded into a container, such as an extraction cylinder. The oil can be extracted by supercritical $CO_2$ at 1070 up to 15,000 or greater psi at 31° C. up to 120° C. for 1 to 600 minutes. For example, the oil can be extracted between 3500- 6500 psi or 3500-5076 psi. For example, the oil can be extracted at about 3500, 4000, 4500, or 5000 psi for 50, 100, 150, 200, 250, 300, 350, 400, 450, 500, 550, or 600 minutes. The oil can be extracted by any suitable organic solvent (non-polar solvents) most often at an elevated temperature that is less than the solvent's boiling point for 1 to 600 minutes. In embodiments using non-polar solvents, a removal step must be applied. For example, a multiple effect evaporator may distill the solvent from the oil by heating under vacuum until the solvent boils and becomes a gas. The oil has a much greater boiling point and will not become gaseous; thus, the two materials will separate. The resulting hemp seed oil composition can be gravity settled, centrifuged, filtered and/or refined to produce a hemp seed oil product. The hemp seed oil product can be packaged for storage/shipment.

In some embodiments, the step of extracting, separating, and/or collecting an oil from the hemp heart protein product pieces produces a de-oiled hemp seed protein composition. The resulting de-oiled hemp seed protein composition can have a fat content of 15, 12, 10, 9, 8, 7, 6, 5, 4, 3, 2, 1% or less. The de-oiled hemp seed protein composition can be milled and may be sieved or classified to produce a protein product. Various mill types, such as an air classifying mill, hammer mill, pin mill, roller mill or others can be used. The protein product may or may not be sieved or classified and it can then be packaged for storage/shipment.

Hemp Seed Protein Product

Improved hemp seed protein products produced by the methods disclosed herein are provided. Some embodiments of the invention relate to a final product comprising the hemp seed protein product produced by the methods, for example a meal replacement bar, nutritional beverage, meat analogue, protein supplement powders and dry mixes, frozen desserts, and more.

In some embodiments, the protein product includes 60-95% hemp protein. The protein product can include at least 60, 65, 70, 75, 80%, 90%, 95% protein, or more. In some embodiments, the protein product can include 0.1-12% residual oil. In some embodiments, the protein product can include less than 6, 5, 4, 3, 2, 1, or 0.5% residual oil/fat.

In some embodiments, the protein product is substantially free of non-hemp compounds. In some embodiments, the protein product is over 95, 96, 97, 98, 99, 99.5, 99.9% endogenous hemp material. In some embodiments, the protein product has improved levels of one or more of tocopherols, polyphenols, contaminant minerals, peroxide value, free fatty acids, etc., where "improved" in this context means more desirable levels of any of these components as would be understood in the art. In some embodiments, the protein product is an improved hemp seed protein product with at least one value parameter determined by comparison with a cold-press hemp seed press cake. The value parameter can be lighter color, improved mouth feel, improved user acceptance, increased digestibility and protein quality, diminished flavor and aroma, improved uniformity, longer shelf life, greater solubility, decreased oxidation, decreased rancidity, increased water holding, increased oil holding, prolonged dispersion in water, increased foaming capacity, increased gelation, greater emulsifying capacity, and/or the like.

Hemp Seed Oil Product

Improved hemp seed oil products produced by the methods disclosed herein are provided. Some embodiments of the invention relate to a final product comprising the hemp seed oil product, for example: a body wash, moisturizing product for hair or skin, lotions, salad dressing, dips and spreads, frozen desserts, and more.

In some embodiments, the oil product is substantially free of non-hemp compounds. In some embodiments, the oil product is over 95, 96, 97, 98, 99, 99.5, 99.9% endogenous hemp material. In some embodiments, the oil product has a shelf life of 6, 7, 8, 9, 10, 11, 12, 13, 14, 15, 16, 17, 18, 24 or more months. In some embodiments, the oil product has a different viscosity compared to cold pressed hemp seed oil. In some embodiments, the oil product is an improved hemp seed oil product with at least one value parameter is determined by comparison with a hemp seed oil product produced by cold-pressing of whole hemp seeds. The value parameter can be decreased oil oxidation, increased shelf life, decreased rancidity, improved user acceptance, lighter color, improved flavor improved aroma, and/or the like. In some embodiments, the method is chemical-free. In some embodiments, the system and methods are substantially mechanical.

Systems

Embodiments of the invention relate to systems for producing hemp seed products including any of the methods disclosed herein. The system can include an input of hemp seeds, seed cleaner, dehuller, one or more cleaner/sorters, a conditioning unit, a continuous expeller press, a de-lumper, a diverter, a returner, a mixer, a collector, an supercritical fluid extractor, non-polar solvent extraction, milling equipment, sieving equipment, and/or any equipment described herein. The system can also include a conveyor belt, elevator or pneumatic tube, an extraction cylinder and/or any containers described herein. When used as a system, the various subassemblies and/or parts are arranged in a way that they interact to provide the result described herein. Hence, the system constitutes the combination of the various mechanical components and process functionalities that provide the desired result of producing the protein and/or oil products described herein.

In some embodiments, the method or system can include a feedback component.

The feedback component can include an inline fat/oil measuring device (some examples of technology that could be used include near infrared (NIR), Fourier transform near infrared (FT-NIR) and infrared (IR) and other rapid inline, nondestructive methods). For example, a rapid secondary method analysis instrument such as the aforementioned can be used. In some embodiments, the analytical device can analyze the proximate composition (fat, protein, carbohydrates, ash, moisture). The process flow can be 100% forward to the next unit operation or a portion between 1:100 to 1:1 part press cake to conditioned isolated hemp hearts can be diverted backward to the inlet of the expeller press based on the residual fat content of the press cake exiting the de-lumper. For example, 1:100, 1:80, 1:60, 1:40, 1:20, 1:10, 1:5, or 1:1 part press cake to conditioned isolated hemp hearts can be diverted backward to the inlet of the expeller press. The feedback apparatus can be manually or automatically operated.

Apparatus

In some embodiments, the invention relates to an apparatus adapted to carry out any of the methods or systems described herein.

EXAMPLES

Example 1

Conversion of Hemp Seeds to Isolated Hemp Hearts

A first phase of the System of the invention converts hemp seeds to isolated hemp hearts. Hemp seeds are de-hulled and cleaned via conventional means including but not limited to impact dehulling, roller, raspeller dehulling, aspiration, fluidized bed gravity tables, sieves, and scalpers. Once substantially free from shells and foreign material, the hearts are conveyed into a hopper that feeds an optical sorter. The optical sorter uses jets of air to blow shells, green seed coat, and any other foreign material out of the product flow and into a collection vessel. The remaining clean hearts, substantially free from all non-heart material, continue into a collection vessel. These are called isolated hemp hearts or WHH.

The isolated hemp hearts are substantially free of chlorophyll and condensed tannins. It should be noted that chlorophylls which is found in abundance in the shell of the hemp seed and the seed coat, play an acute role in oil oxidation, as described further in Example 4. Condensed tannins are widely considered antinutrients because they may bind to proteins and reduce the protein bioavailability. Chlorophyll is sensitive to heat, light and oxygen. As chlorophyll decomposes, free radical peroxides are produced. This rapidly leads to oil oxidation and rancidity. In contrast to seeds, isolated hemp hearts do not have any substantial amount of chlorophyll, condensed tannins, or other endogenous components that, individually or collectively, would promote oxidation and deterioration of the quality of the products of the System.

Example 2

Conditioning of Isolated Hemp Hearts

In a second phase of the System, the isolated hemp hearts are loaded into a conditioner that consists of a heated surface with a sweeping mixing blade. The hearts are conditioned by heating them to an internal temperature of at least 60° C. and up to 140° C. This pre-conditioning with heat breaks down oil bodies within the isolated hemp hearts, permitting efficient oil extraction under pressure, as described in the next Examples. The desired internal temperature is reached by a combination of conditioner temperature, residence time of the seeds, and quantity (or aggregate mass) of seeds to be roasted. These parameters can be determined empirically for each conditioner.

In a batch-process approach, once this residence time and desired internal temperature of the seeds has been reached, the conditioner is emptied, and further processing of isolated hemp hearts is done as described in the subsequent examples. In a batch-continuous approach, the appropriate residence time and internal temperature of the isolated hemp hearts are achieved by moving a given quantity or mass of isolated hemp hearts at a pre-determined rate through a continuous-type conditioner such as a rotary steam conditioner or vertical plate, deep bed or other type cooker. A combination of parameters including the isolated hemp hearts loading rate into the conditioner, the rate of progress through the conditioner, the surface temperature and air temperature and circulation within the conditioner, and the like, work together to achieve a desired residence time and final internal temperature of the isolated hemp hearts. The batch conditioner heating in this example is preferably set to 140° C. The isolated hemp hearts are heated for 20 minutes until they reach 100° C. The isolated hemp hearts are then discharged and moved to the next unit operation. Conditioner-specific operational parameters are highly dependent on the type of conditioner, quantity of isolated hemp hearts to be conditioned and the like.

In a semi-continuous process approach, the conditioner comprises multiple conditioning drums. While the first drum is conditioning, the second drum is being unloaded and re-loaded with un-conditioned isolated hemp hearts. In this manner there is minimal time between batches, thus maximizing capacity. Conditioning can be with or without additional hot air for drying effect. In this approach the isolated hemp hearts are loaded into the dryer at a constant rate, heated and dried within the cooker body, rotating drum. The conditioner will empty into a feed or surge hopper for the batch or continuous oil press. This semi-continuous approach can also be accomplished using rotating drum, swept heated surface, stacked type conditioners, or the like.

In a continuous approach, the appropriate residence time and internal temperature of the isolated hemp hearts are achieved by moving a given quantity or mass of isolated hemp hearts at a pre-determined rate through a continuous-type conditioner such as a rotary steam conditioner or vertical plate conditioner, deep bed conditioner cooker or the like. A combination of parameters including the isolated hemp hearts loading rate into the conditioner, the rate of progress through the conditioner, the surface temperature and air temperature and circulation within the conditioner, and the like, work together to achieve a desired residence time and final internal temperature of the isolated hemp hearts.

In a continuous process approach, the conditioner is continually being fed and emptied of conditioned hearts. This may be accomplished with a rotary steam tube dryer, a rotary dryer with external heat, either of the aforementioned with or without additional hot air for drying effect. In this approach the isolated hemp hearts are loaded into the dryer at a constant rate, heated and dried within the rotating drum, and continuously emptied at the same rate. The conditioner will empty into a feed or surge hopper for the batch or continuous oil press. This continuous approach may also be accomplished using stacked type conditioners vertical plate conditioner, deep bed conditioner, or the like.

Example 3

Bagging Roasted White Hemp Heart

In a third phase of the batch System, the hot isolated hemp hearts are loaded into pressing bags made of polyethylene terephthalate polyester. The bags are woven or otherwise porous. Bags made from other food safe, thermally stable natural or synthetic polymers can be used. These bags allow for very high pressures to be applied without material being forced through the oil perforations in the hydraulic press as described in Example 4.

Bagging the isolated hemp hearts in the specially suited bags of the System avoids the difficulties commonly found in working with dehulled seeds. This is because, typically, a minimum amount of fiber is required to prevent the biomass from co-rotating with the press screw or becoming a paste. Essentially, the bags of the System avoid the need for any presence of fiber from hulls or other form of added fiber that would be necessary, in other approaches, to effective pressing and oil extraction.

Example 4

Pressing the Roasted and Bagged White Hemp Heart

In a fourth phase of the batch System, the roasted and bagged isolated hemp hearts are pressed. The press can be operated at ambient temperatures, but it is preferred to operate at 40° C. and more preferred to operate at 60° C. or greater to facilitate oil expression. The press subjects the conditioned, isolated hemp hearts to hydraulic pressure in excess of 8,900 psi for a period of 0 to 120 minutes. In this phase of the System, conditioned isolated hemp hearts are de-oiled to <20% residual oil. The press conditions can be altered to achieve a reduction to as low as 2% residual oil.

In a batch-process approach, the press is employed until the desired pressure and residence time are achieved. This can be determined based upon the amount of residual oil found in the isolated hemp hearts material after pressing. After a batch is pressed, the bags are removed from the press and other bags can be loaded for pressing. In a semi-continuous approach, the pressing is carried out by feeding bags of roasted, isolated hemp hearts into a serial press that applies increasing amounts of pressure to the bags as they move through the press. Adjustments to the rate of progress through the serial press permit achievement of the desired pressing time and the desired amount of residual oil in the pressed isolated hemp hearts material. A serial press of the System can have stages wherein different pressing plates apply different amounts of pressure for a pre-set time before the bagged isolated hemp hearts material moves to a subsequent plate. Between moving from plate to plate, various methods can be employed to break apart the cake to facilitate further oil removal. Alternatively, the serial press can have a series of rollers whose size, spacing, and other parameters permit application of increasing pressure to the bags as the bags progress through the various rollers. Alternatively, bags can be loaded into cylinder for pressing, pressed, then broken apart and moved to the next pressing cylinder, with up to five or more pressing cycles.

Example 5

Expeller Pressing Isolated Hemp Hearts

In a continuous approach, instead of bagging the isolated hemp hearts, the conditioned isolated hemp hearts are deposited into a feed or surge hopper for the screw type oil expeller press. There may or may not be a feed auger or conveyance, and a single or multiple screw system arranged as a single screw, a single screw that feeds another screw or an arrangement of two screws with or without feeding screw, that intermesh and operate parallel to each other to convey material through the pressing barrel or body. The material drops from the hopper into the auger body that conveys it into the press opening or throat. It is then pressed by the single screw, two screws in sequence, or twin screw in parallel expeller press to shear and compress the isolated hemp hearts until the majority of the oil contained in them is liberated and empties the press by perforations or gaps in the expeller barrel. In this phase of the System, conditioned isolated hemp hearts are de-oiled to <20% residual oil. The press conditions can be altered to achieve a reduction to as low as 8% residual oil. The de-oiled press cake exits the nozzle at the end of the barrel and is conveyed to the next process step.

Example 6

Improving Pressing Efficiency by Press Cake Reprocessing

In the continuous approach, the expeller press produces de-oiled, isolated hemp hearts or press cake as an outcome. This material may be conveyed to the next unit operation, or a portion of the press cake may be conveyed to the expeller press throat or feed inlet. It may be broken into smaller particles or repressed as in the same condition it initially exits the expeller press. The press cake is conveyed to a volumetric or gravimetric metering feeder that meters in the appropriate amount of press cake with heated, isolated hearts to be fed into the surge or feed hopper of the expeller press. This mixture is processed in the expeller press into an oil product and a press cake product. The continuous process employed in this system allows for pressing without the use of shells or an exogenous fiber source, thus maintaining the desired smooth texture. Previously pressed, the press cake is broken apart using a de-lumper, then recycled back to the infeed of the expeller press in a metered fashion at a ratio of 1:100 to 1:1 parts press cake to conditioned isolated hemp hearts by use of volumetric feeder. This pre-pressed cake acts to improve oil yield and as a pressing aide to increase friction and help move unpressed hearts through the expeller. In this phase of the System, conditioned isolated hemp hearts are de-oiled to <20% residual oil. The press conditions can be altered to achieve a reduction to as low as 5% residual oil.

Example 7

Oil Recovered from the Pressing Phase

The pressing phase of the System produces oil as one outcome. Importantly, the hemp seed oil produced by the System is substantially free of chlorophyll, which if present, would rapidly lead to oil oxidation and rancidity. Hemp seed oil is rich in polyunsaturated fats. While beneficial for human nutrition, these fats are especially susceptible to oxidative rancidity. It is beneficial to produce oil substantially free from chlorophyll, and other unstable phytochemicals. The oil contains small, but appreciable amounts of naturally occurring, endogenous tocopherols and sitosterols, both of which are antioxidants that prolong oil shelf life. The resulting oil contains impurities such as pieces or hearts, dense gums, other substances. These are removed by allowing the mixture to settle via gravity or centrifugation to separate solids and more dense impurities. The oil is then filtered to clarify and remove potential microbial contaminants. The oil is tested in assays, for example, an assay for free fatty acids, peroxide value, and/or p-anisidine value.

Example 8

Press Cake Recovered from the Pressing Phase, and Further Processing

In addition to the oil recovered from the pressing phase, the System also produces a de-oiled isolated hemp hearts material known as press cake. In another phase of the System, the press cake from the expeller presses or press bags is de-lumped or broken into small pieces of less than 5 mm by a de-lumper. The physical characteristics of the de-lumper are employing mechanical force to break apart the cake into smaller pieces. The size distribution of the pieces can be adjusted by speed and spacing of the rotating teeth and stationary teeth. One parameter is the particle size distribution of the de-lumped material. The de-lumped material is substantially free from fines and free from oversized particles. Fines are particles of a size such that they interfere with proper processing in subsequent unit operations. Practically this means <0.5 mm. Oversized particles can also interfere with subsequent unit operations. In this example oversize particles are >5 mm. The de-lumper can be comprised of one or more spinning cylinder with teeth that rotates. The teeth intermesh with a stationary set of teeth of the machine. As it rotates, press cake is broken between the moving and stationary teeth. There is sufficient space between the teeth that appropriately sized particles fall by gravity into a collection hopper below the machine and large particles remain in the machine until broken down to an appropriate size. The de-lumper may have one or many rotating cylinders with teeth and static teeth that intermesh and crush the cake into smaller pieces. Alternative de-lumping or cake breaking approaches include spinning knives or blades and vibratory decomposition of the press cake into smaller pieces.

In conventional hemp seed processing and pressing, the press cake retains a grainy texture even when finely ground and sifted, due to the large quantity of water-insoluble hull pieces. However, the press cake of the System does not have this grainy texture because the isolated hemp hearts are substantially free of hull pieces. If bags are employed, the bags used in the pressing phase obviate the need for added fiber or hull pieces in the pressing process.

Example 9

Extraction of Remaining Oil from the Press Cake

In a subsequent phase of the System, the delumped press cake material is loaded into an extraction cylinder for supercritical fluid $CO_2$ extraction. In some applications Supercritical $CO_2$ behaves similarly to a non-polar solvent. Hemp seed oil is primarily composed of non-polar triglycerides. Operating on the principle of like dissolves like, the compressed CO₂ dissolves oil in the press cake pieces and carries the oil away from the press cake pieces. The oil is extracted at 1070 up to 15000 psi at 31° C. up to 120° C. for 0 to 600 minutes. The relatively low temperature of the process and inert nature of CO₂ also allows the oils to be extracted to be with little damage to oil quality or denaturation of proteins and no residual organic solvents. This phase de-oils the seed cake to levels of 6% or less fat. Protein powders are prone to oxidative damage due to the large surface area of the small particles. Reducing the fat content prolongs shelf life before rancid type flavors develop.

Example 10

Extraction of Remaining Oil from the Press Cake

In a next phase of the System, the de-lumped press cake material is loaded into an extraction vessel or continuous co-current or counter-current non-polar solvent extractor. Many solvents are non-polar and dissolve other non-polar compounds. Hemp seed oil is primarily composed of non-polar triglycerides. The oil is extracted using a suitable non-polar solvent such as hexane, chosen because it is relatively non-toxic, dissolves edible oil well, and requires low thermal input to evaporate it from the cake and oil products. This non-polar solvent phase requires a thermally driven evaporation of residual solvent in both the oil and protein powder products. This phase de-oils the seed cake to levels of 6% fat or less. Removal of oil improves the shelf stability of the hemp proteins by reducing the off flavors created by oil rancidity. Protein powders are prone to oxidative damage due to the large surface area of the small particles. Reducing the fat content prolongs shelf life before rancid type flavors develop.

The de-lumped press cake material is loaded into an extraction vessel or continuous concurrent or countercurrent nonpolar solvent extractor. Many nonpolar solvents are non-polar and dissolve other non-polar compounds. Hemp seed oil is primarily composed of non-polar triglycerides. The oil is extracted using a suitable solvent such as hexane, chosen because it is relatively non-toxic, dissolves oil well, and requires low thermal input to remove it from the cake and oil products by distillation or other thermally driven process. Any other nonpolar solvent with the traits described previously may be used. This nonpolar solvent phase requires a thermally driven evaporation of residual solvent in both the oil and protein powder products. This phase de-oils the seed cake to levels of 6% fat or less. Removal of oil improves the shelf stability of the hemp proteins by reducing the off flavors created by oil rancidity. Protein powders are prone to oxidative damage due to the large surface area of the small particles. Reducing the fat content prolongs shelf life before rancid-type flavors develop.

Example 11

Recovery and Characteristics of Novel Protein Produced by the System

TABLE 1

Typical Certificate of Analysis Specifications

| Analysis type | Specification |
|---|---|

TABLE 1-continued

| | |
|---|---|
| Aerobic Plate Count | <10,000 cfu/g |
| Total coliform | <3 MPN/g |
| E. coli | <3 MPN/g |
| Salmonella | Negative/375 g |
| Staph. Aureus | <3 MPN/g |
| Protein | >70% w/w |
| Yeast & Mold | <500 cfu/g |
| Gluten | <10 ppm |
| Moisture | <8% |
| THC Content | ≤4 ppm |

Typical Values per 100 g protein product

| | |
|---|---|
| Ash | <12 g |
| Calories | 350 g |
| Carbohydrates | <12 g |
| Fat | <6 g |
| Cholesterol | 0 g |
| pH Value | 6.5 g |

Amino Acid Analysis

| Per 100 g Novel Protein Concentrate Product | Weight | % of total Protein |
|---|---|---|
| Cysteine & Methionine** | 2.9 g | 4.3 |
| Tryptophan** | 0.9 g | 1.3 |
| Aspartic acid | 7.1 g | 10.6 |
| Threonine** | 2.3 g | 3.4 |
| Serine | 3.42 g | 5.1 |
| Glutamic acid | 12.31 g | 18.4 |
| Proline | 2.65 g | 4 |
| Glycine | 3 g | 4.5 |
| Alanine | 2.88 g | 4.3 |
| Valine** | 3.37 g | 5 |
| Isoleucine** | 2.72 g | 4.1 |
| Leucine** | 4.52 g | 6.7 |
| Tyrosine & Phenylalanine** | 5.43 g | 8.1 |
| Lysine** | 2.58 g | 3.9 |
| Histidine** | 1.9 g | 2.8 |
| Arginine | 9.01 g | 13.4 |

**Indicates an essential amino acid as defined by the World Health Organization

Using an in-vitro protein digestibility adjusted amino acid score (PDCAAS), the novel hemp heart protein concentrate scored 0.63. This is more digestible than the typical PDCAAS score of 0.5 to 0.55 of hemp seed protein made by the typical green oil and protein process.

Example 12

Characteristics of Oil Produced by the System

TABLE 2

Certificate of Analysis Specifications

| Analysis type | Specification |
|---|---|
| Aerobic Plate Count | <10,000 cfu/g |
| Total coliform | <3 MPN/g |
| e. coli | <3 MPN/g |
| Salmonella | Negative/375 g |
| staph. aureus | <3 MPN/g |
| Yeast & Mold | <500 cfu/g |
| Gluten | <10 ppm |
| THC Content | ≤10 ppm |
| Free Fatty Acids | ≤2% expr. as Oleic Acid |
| Peroxide Value | ≤10.0 mEq/kg |

Typical Values per 100 g

| | |
|---|---|
| Calories | 900 cal |
| Carbohydrates | 0 |

TABLE 2-continued

| Fat | >97% w/w |
|---|---|
| Protein | 0 |
| Cholesterol | 0 |

| Fat Composition | |
|---|---|
| Fatty Acid | Percent of total fat |
| c-Linoleic | 55.768 |
| c-alpha Linolenic | 17.189 |
| cis Oleic | 12.183 |
| Palmitic | 5.179 |
| gamma Linolenic | 4.016 |
| Stearic | 2.456 |
| Stearidonic | 1.225 |
| Arachidic | 0.826 |
| Gadoleic | 0.393 |
| Behenic | 0.331 |
| t-Octadecadienoic | 0.131 |
| Lignoceric | 0.12 |
| Palmitoleic | 0.071 |
| Eicosadienoic | 0.071 |
| Margaric | 0.041 |

Example 13

Product Comparison 1

Table 3 provides a comparison of the products of the System carried out with other products made by other approaches. "V70™ Hemp Heart Protein Concentrate" is a protein powder product produced by the methods described herein. "Protein50" is a hemp seed press cake produced by the method described herein. Protein50 is a traditional hemp seed protein concentrate made from press cake. The whole or dehulled seeds are expeller pressed, milled, and sifted or classified. This protein product includes small pieces of shell, condensed tannins and chlorophylls. It can be manufactured in batch, semi-continuous, or continuous fashion.

TABLE 3

| A. | B. | C. | D. | E. | F. | G. |
|---|---|---|---|---|---|---|
| Victory Hemp Foods: V-70 ™ Hemp Heart Protein Concentrate* | >70 | <6 | <10 | <14 | <8 | white, smooth texture |
| Victory Hemp Foods: Protein50* | 50% | 9-18% | 9-20 | 6-9 | 5-11 | green, grainy |
| Liaoning Qiaopai Biotech Co., Ltd | 65.8 | 2.99 | 16.6 | 9.6 | 5.02 | Bitter. Notable black speckles, off white. |
| Manitoba Harvest: Hemp Yeah! | 62.5 | 18.75 | 6.25 | <12.5 | <12.5 | Slightly gritty/grainy. |
| Hemp Oil Canada: Hemp Bev 65 | 65 | — | — | — | — | Slightly gritty/grainy in application |
| GFR Ingredients: Hemp-Sol 80 | 76-80 | 12 | 1.4 | — | <5 | Water extracted, green, vegetal flavor |
| EVO Hemp: 50% Protein | 32.4 | 8.63 | 46.6 | 6.79 | 5.55 | Green, gritty, bitter, astringent. |
| EVO Hemp: 90% | 90 | 3 | 0 | <7 | <7 | Off-white, poor solubility. Bitter flavor. |
| Good Hemp: 85% Hemp Protein | >8 5% | <4 | <0.1 | — | — | Sour, vegetal, musty flavor. Slight grittiness |

*product produced by the invention
Table Key
A. Product
B. % Protein
C. % Fat
D. % Carbohydrates
E. % Ash
F. % Moisture
G. Qualitative Example 14

Product Comparison 2

Typical proximate composition of whole hemp seeds, shelled hemp seeds, typical green oil process oil (Cold Pressed Hemp Seed Oil), typical green oil process press cake (Protein33), typical green oil process hemp protein concentrate (Protein50), novel system process hemp protein concentrate and oil (V70™ Hemp Heart Protein Concentrate and V-ONE™ Hemp Heart Oil). "V-ONE™ Hemp Heart Oil" is an oil product produced by the methods disclosed herein. "V70™ Hemp Heart Protein" is a protein product produced by the methods disclosed herein.

TABLE 4

| A. | B. | C. | D. | E. | F. | G.* | H.* |
|---|---|---|---|---|---|---|---|
| CARBOHYDRATES | 6.05 | 4.39 | <0.1 | 50 | 18.1 | 6.5 | <0.1 |
| ASH | 5 | 5.75 | <0.1 | 6 | 8.2 | 12 | <0.1 |
| FAT | 49 | 48.9 | 100 | 10 | 17.6 | 2.5 | 100 |
| MOISTURE | 5.55 | 5.76 | <0.1 | 1 | 7.3 | 5 | <0.1 |
| PROTEIN | 34.4 | 35.2 | <0.1 | 33 | 48.8 | 74 | <0.1 |
| CHECK SUM | 100 | 100 | 100 | 100 | 100 | 100 | 100 |

*products produced by the invention
Table Key
A. Proximate
B. Seeds
C. Hemp Seed
D. Oil
E. Protein 33
F. Protein 50
G. V-70 ™ Hemp Heart Protein*
H. Hemp Heart Oil*

Example 15

Figure 1:
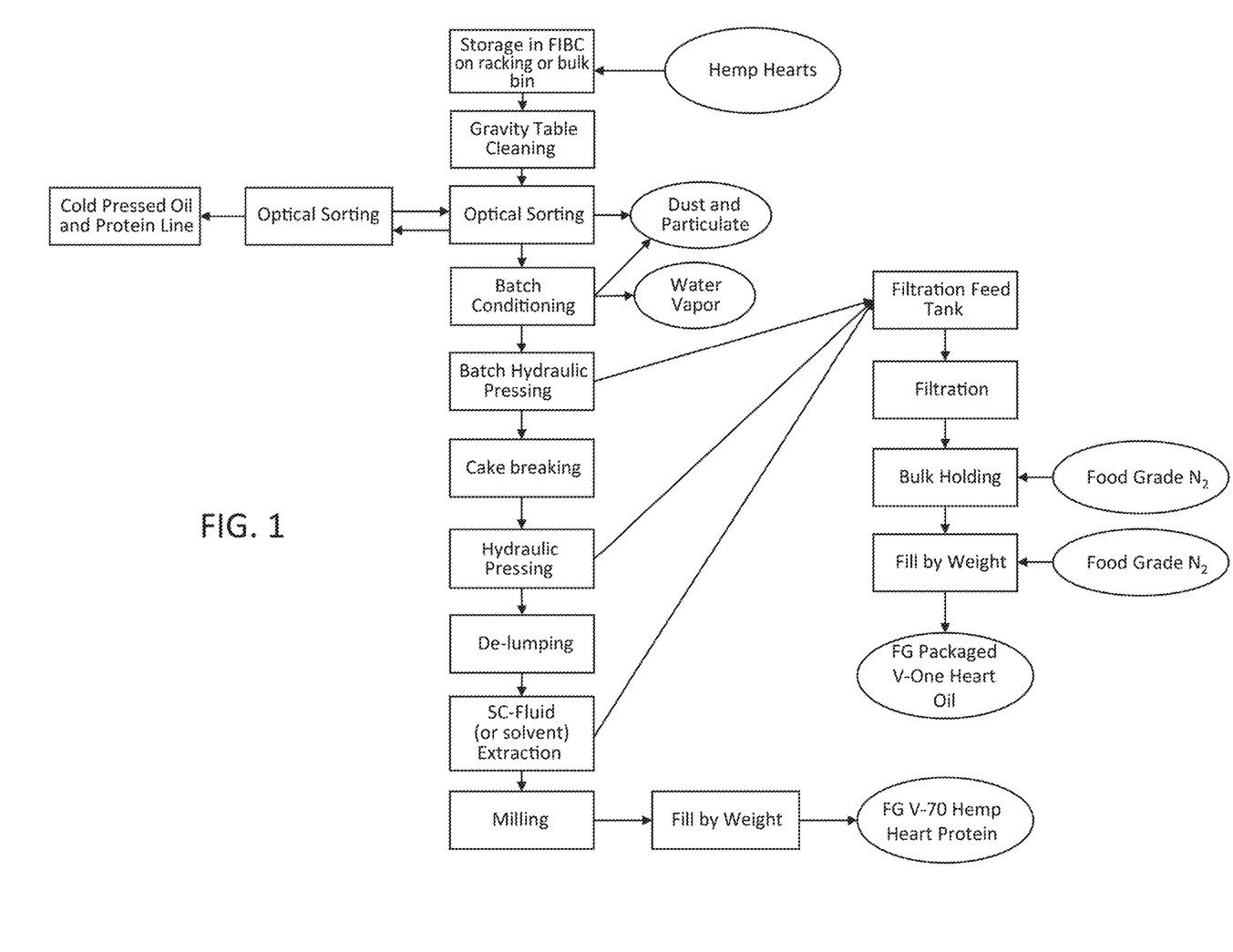
FIG. 1 is a flow chart of a batch method.
Figure 2:
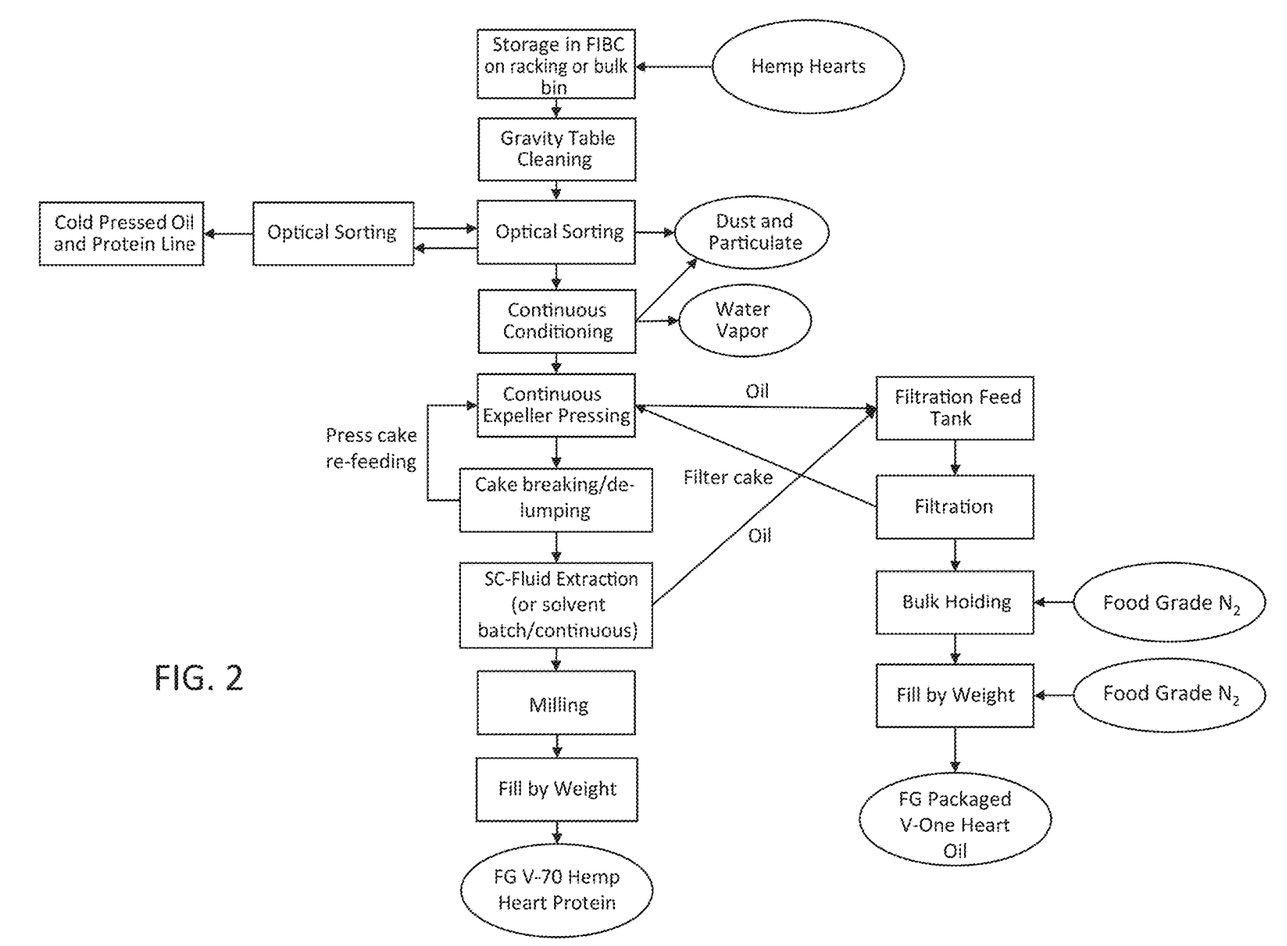
FIG. 2 is a flow chart of a continuous method.
Figure 3:
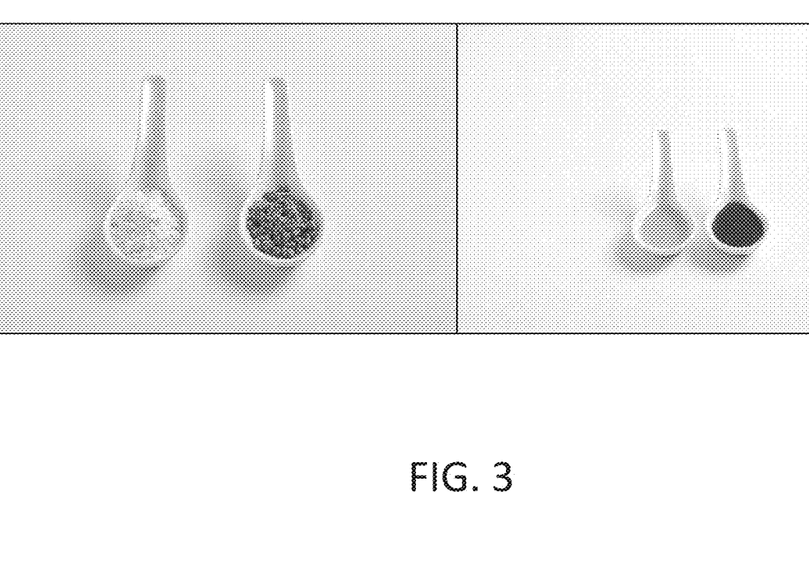
FIG. 3 is a photograph comparing a product produced by the invention to a product produced by conventional methods.

Cold Pressed Oil and Press Cake Versus V-ONE™ Hemp Heart Oil and V70™ Hemp Heart Protein Powder The prior art protein powders range from light green to deep green-brown (see FIG. 3). They suffer from astringency, grainy mouthfeel, and poor protein functionality in food and beverage applications.

Example 16

Product Comparison 3

Some advantages of this process include extended shelf life, improved flavor, improved consumer liking and acceptance, and suitability in a wide range of food, beverage, and personal care applications. Shelf life of both protein powder and oil are at least 1 year, respectively. Previous protein powders made from whole hemp seeds begin to change color and flavor often becomes objectionable before 1 year of shelf life. The oil shelf life is extended due to diminished chlorophyll content. Chlorophyll is unstable in the presence of heat and especially light. As it decomposes, free radicals are formed that initiate further damage to fatty acids, leading to a cascading degradation and rancid oil.

Consumer acceptance and preference in model applications is significantly improved by utilizing the protein and oil ingredients versus the traditional hemp protein and cold pressed oils. Paired preference sensory analysis was conducted on four model food applications ("meat" crumble, smoothie, muffin, frozen "gelato" novelty). The results are summarized.

"Meat" analogue crumble application showed consumers preferred the novel hemp heart protein concentrate crumble versus the typical hemp seed protein concentrate. Significant preference was found using p=0.05 and n=18. Raw data show 94.4% of consumers prefer the novel hemp heart protein concentrate formula 17 versus 1 for typical hemp seed protein concentrate formula.

Smoothie application showed consumers preferred the novel hemp protein concentrate smoothie versus the typical hemp seed protein concentrate smoothie. Significant preference was found using p=0.05 and n=16. Raw data show 87.5% of consumers prefer the novel hemp heart protein concentrate formula 14 versus 2 for typical hemp seed protein concentrate formula.

Muffin application showed consumers preferred the novel hemp protein concentrate muffin versus the typical hemp seed protein concentrate muffin. p=0.05, n=17. Raw data show 82.3% of consumers prefer the novel hemp heart protein concentrate formula 14 versus 3 for typical hemp seed protein concentrate formula.

Frozen "gelato" type dessert application showed consumers preferred the novel hemp heart oil "gelato" versus the typical hemp seed oil "gelato". However, significant preference was not found using p=0.05 and n=14. Raw data show 71.4% consumers prefer the novel hemp heart oil formula 10 versus 4 for typical hemp seed oil formula.

Example 17

Model Application Formulations

| "Meat" crumble | | |
|---|---|---|
| Product Name V-70 ™ Crumbles | | |
| Ingredients | Weight (g) | Component % |
| V-70 ™ Hemp Heart Particles | 83 | 31.68% |
| Water | 176 | 67.18% |
| Umami potentiator (MSG or other) | 1 | 0.38% |
| Salt | 2 | 0.76% |
| Total Batch weight | 262 | 100.00% |
| Product Name P-50 Crumbles | | |
| Ingredients | Weight (g) | Component % |
| P-50 | 83 | 29.54% |
| Water | 195 | 69.40% |
| Umami potentiator (MSG or other) | 1 | 0.36% |
| Salt | 2 | 0.71% |
| Total Batch weight | 281 | 100.00% |

| Smoothie | | |
|---|---|---|
| Product Name V-70 ™ Blueberry Smoothie (20 g plant protein per serving) | | |
| Ingredients | Weight (g) | Component % |
| Blue berries | 180 | 35.185% |
| Vanilla yogurt | 36 | 7.037% |
| V-70 ™ | 28.58 | 5.587% |
| Milk | 100 | 19.547% |
| Water | 165 | 32.253% |
| Sugar | 2 | 0.391% |
| Total Batch weight | 511.58 | 100.000% |
| Product Name P-50 Blueberry Smoothie 20 g plant protein per batch | | |
| Ingredients | Weight (g) | Component % |
| Blueberries | 180 | 34.417% |
| Vanilla yogurt | 36 | 6.883% |
| P-50 | 40 | 7.648% |
| Milk | 100 | 19.120% |
| Water | 165 | 31.549% |
| Sugar | 2 | 0.382% |
| Total Batch weight | 523 | 100.000% |

| Muffin | | |
|---|---|---|
| Product Name V-70 ™ Muffins | | |
| Ingredients | Weight (g) | Component % |
| All Purpose Wheat Flour | 132 | 16.93% |
| V-70 ™ | 128 | 16.41% |
| Granulated Sugar | 100 | 12.82% |

-continued

| Muffin | | |
|---|---|---|
| Baking Powder | 12 | 1.54% |
| Salt | 2.8 | 0.36% |
| Milk | 183 | 23.47% |
| Vegetable Oil | 114 | 14.62% |
| Egg | 108 | 13.85% |
| Total Batch weight | 779.8 | 100.00% |

| Product Name P-50 Muffins | | |
|---|---|---|
| Ingredients | Weight (g) | Component % |
| All Purpose Wheat Flour | 69 | 8.85% |
| P-50 | 191 | 24.49% |
| Granulated Sugar | 100 | 12.82% |
| Baking Powder | 12 | 1.54% |
| Salt | 2.8 | 0.36% |
| Milk | 183 | 23.47% |
| Vegetable Oil | 114 | 14.62% |
| Egg | 108 | 13.85% |
| Total Batch weight | 779.8 | 100.000% |

| Frozen "gelato" type dessert | | |
|---|---|---|
| Product Name Non-Dairy Frozen Hemp Dessert (Gelato) V-ONE ™ | | |
| Ingredients | Weight (g) | Component % |
| Oat milk | 649 | 76.013% |
| V-ONE ™ | 44 | 5.153% |
| Granulated Sugar | 120 | 14.055% |
| Cocoa butter | 22 | 2.577% |
| V-70 ™ Hemp Heart Protein | 10 | 1.171% |
| Gum blend | 0.8 | 0.094% |
| Vanilla | 8 | 0.937% |
| Total Batch weight | 853.8 | 100.000% |

| Product Name Non-Dairy Frozen Hemp Dessert (Gelato) | | |
|---|---|---|
| Ingredients | Weight (g) | Component % |
| Oat milk | 649 | 76.013% |
| Cold Pressed Hemp Seed Oil | 44 | 5.153% |
| Granulated Sugar | 120 | 14.055% |
| Cocoa butter | 22 | 2.577% |
| V-70 ™ Hemp Heart Protein | 10 | 1.171% |
| Gum blend | 0.8 | 0.094% |
| Vanilla | 8 | 0.937% |
| Total Batch weight | 853.8 | 100.000% |

Example 18

Equipment Design

Gravity Table
Optical Sorting
Conditioning/Cooking
Expeller Pressing
De-lumping
Recycling/Volumetric/Gravimetric Feeder
SC-CO2
Filtration
Milling Packaging The various methods and techniques described above provide a number of ways to carry out the application. Of course, it is to be understood that not necessarily all objectives or advantages described are achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some embodiments specifically include one, another, or several features, while others specifically exclude one, another, or several features, while still others mitigate a particular feature by including one, another, or several other features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, any numbers expressing quantities of ingredients, properties such as molecular weight, reaction conditions, and so forth, used to describe and claim certain embodiments of the disclosure are to be understood as being modified in some instances by the term "about." Accordingly, in some embodiments, the numerical parameters set forth in the written description and any included claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are usually reported as precisely as practicable.

In some embodiments, the terms "a" and "an" and "the" and similar references used in the context of describing a particular embodiment of the application (especially in the context of certain claims) are construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Variations on preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A system for processing hemp seeds to recover at least one product, the system comprising:
   a sorter, adapted to separate the hulls and the hemp hearts to produce an isolated hemp heart fraction substantially free of hulls;
   a conditioner, adapted to condition the isolated hemp hearts to a pre-determined internal temperature and moisture content, resulting in conditioned hemp hearts, wherein the pre-determined internal temperature is at least 40° C.;
   a press, adapted to permit extraction of oil from the hemp hearts, resulting in a hemp hearts press cake;
   a diverter adapted to divert hemp heart press cake particles into a first output stream and a second output stream;
   a returner adapted to return the first output stream to the system between the conditioner and the press;
   wherein, upon operation of the system, at least one product having at least one value parameter is recovered, wherein the product is at least one of an improved hemp seed oil product and an improved hemp seed protein product.

2. The system of claim 1, adapted for continuous processing, wherein the press is a continuous screw type expeller press or a twin-screw expeller press.

3. The system of claim 1, adapted for batch processing, additionally comprising a press bag adapted to contain the isolated hemp hearts after conditioning, wherein the press is adapted to apply sufficient pressure to the press bag containing isolated hemp hearts to permit extraction of oil from the hemp hearts, resulting in a hemp hearts press cake.

4. The system of claim 1, wherein the product is an improved hemp seed oil product, and wherein the at least one value parameter is determined by comparison with a hemp seed oil product produced by cold- expeller pressing of whole hemp seeds, and wherein the value parameter is selected from: decreased oil oxidation, increased shelf life, decreased rancidity, improved user acceptance, lighter color, improved flavor and aroma.

5. The system of claim 1, wherein the product is an improved hemp seed protein product, and wherein the at least one value parameter is determined by comparison with a cold-press hemp seed press cake, and wherein the value parameter is selected from lighter color, improved mouth feel, improved user acceptance, improved uniformity, improved shelf life, decreased oxidation; decreased rancidity, improved water holding, improved oil holding, improved dispersion in water, improved foaming capacity, improved gelation, and improved emulsifying capacity.

6. The system of claim 1, wherein the sorter comprises at least one of a size, shape, density, or spectrophotometric detection of materials to be sorted.

7. An apparatus comprising:
   an input of hemp seeds;
   a dehuller, adapted to dehull the hemp seeds, resulting in hulls and hemp hearts;
   a sorter, adapted to separate the hulls and the hemp hearts to produce an isolated hemp heart fraction that is substantially free of hulls and seed coat;
   a conditioner, adapted to condition the isolated hemp hearts to a pre-determined internal temperature and moisture content, wherein the pre-determined internal temperature is at least 40° C.;
   a press, adapted to permit extraction of oil from the hemp hearts, resulting in a hemp hearts press cake;
   a diverter adapted to divert hemp heart press cake particles into a first output stream and a second output stream;
   a returner adapted to return the first output stream to the system between the conditioner and the press.

8. The apparatus of claim 7, further comprising a feedback component.

9. The system of claim 1 further comprising a delumper, adapted to delump the hemp hearts press cake, resulting in substantially uniform hemp heart press cake particles.

10. The system of claim 1, further comprising a mill, suitable to reduce the hemp heart press cake particles after de-oiling to less than 500 microns.

11. The apparatus of claim 8, wherein the feedback component comprises a proximate composition or oil content measuring device.

12. The apparatus of claim 8, wherein the feedback component feedback comprises one or more of measurements of power consumption of the press, temperature of the press, temperature of the press cake, composition of the press cake and measurements of de-oiling efficacy.

13. The apparatus of claim 8, wherein the feedback component comprises automatic adjustments of the apparatus.

14. The apparatus of claim 7, further comprising a delumper, adapted to de-lump the hemp hearts press cake, resulting in substantially uniform hemp heart press cake particles.

15. The apparatus of claim 7, further comprising a mixer adapted to mix the first output stream with the conditioned hemp hearts.

16. The apparatus of claim 7, further comprising a collector adapted to collect the second output.

17. The apparatus of claim 7, further comprising a mill, suitable to reduce hemp heart press cake particles after de-oiling to less than 500 microns.

18. The system of claim 1, further comprising a supercritical fluid or a solvent extractor, adapted to de-oil the hemp hearts press cake to produce an extracted hemp seed product.

19. The apparatus of claim 7, further comprising supercritical fluid or a solvent extractor, adapted to de-oil the second output stream to produce an extracted hemp seed product.

\* \* \* \* \*